United States Patent
Thomas et al.

(10) Patent No.: US 12,023,773 B1
(45) Date of Patent: Jul. 2, 2024

(54) FLOATING SHOT PIN ASSEMBLY AND METHOD

(71) Applicant: E&E Custom Products, LLC, Warren, MI (US)

(72) Inventors: Timothy Thomas, St. Clair Shores, MI (US); Chad Edens, Warren, MI (US); Janice Lewis, Warren, MI (US); Jack Thomas, Warren, MI (US)

(73) Assignee: E&E CUSTOM PRODUCTS, LLC, Warren, MI (US)

( * ) Notice: Subject to any disclaimer, the term of this patent is extended or adjusted under 35 U.S.C. 154(b) by 519 days.

(21) Appl. No.: 17/402,477

(22) Filed: Aug. 13, 2021

Related U.S. Application Data

(60) Provisional application No. 63/065,489, filed on Aug. 13, 2020, provisional application No. 63/065,007, filed on Aug. 13, 2020.

(51) Int. Cl.
  *B23Q 7/00* (2006.01)
  *B23Q 3/10* (2006.01)
  *B23Q 3/18* (2006.01)

(52) U.S. Cl.
  CPC ............ *B23Q 7/005* (2013.01); *B23Q 3/106* (2013.01); *B23Q 3/18* (2013.01)

(58) Field of Classification Search
  CPC ........ B23Q 3/082; B23Q 3/102; B23Q 3/103; B23Q 3/106; B23Q 3/107; B23Q 3/108; B23Q 3/18–186; B23Q 1/009; B23Q 1/52; B23Q 1/035; B23Q 1/037; H01L 21/68742
  See application file for complete search history.

(56) References Cited

U.S. PATENT DOCUMENTS

| | | | | |
|---|---|---|---|---|
| 6,241,228 B1 * | 6/2001 | Chupick | ................ | B23Q 1/009 269/48.1 |
| 10,799,992 B2 * | 10/2020 | Yotz | ...................... | B23Q 3/106 |
| 2004/0070130 A1 * | 4/2004 | Pavlik | ..................... | B25B 5/061 269/32 |
| 2020/0101572 A1 * | 4/2020 | Spanner | ................. | B23Q 3/005 |

* cited by examiner

*Primary Examiner* — Tyrone V Hall, Jr.
(74) *Attorney, Agent, or Firm* — FisherBroyles, LLP; W. Scott Harders

(57) ABSTRACT

A device and method of a floating shot pin combines the actions of a floating pin with a retracting pin. The assembly includes a body having an internal inward taper; and a pin retainer shaft at least partially housed within the body and connected to a cylinder shaft. The pin retainer shaft including a shaped shoulder portion corresponding to the inward taper. In an extended state, the cylinder shaft urges the shaped shoulder portion of the pin retainer shaft to engage with the inward tapered portion of the body creating a locked position to support a workpiece on a pin while work is performed. In a retracted state, the cylinder shaft retracts leaving the locked position allowing the pin retainer shaft to float within tolerances in the connection between the pin retainer shaft and the cylinder shaft thereby relieving pressure on a pin while the workpiece is removed.

10 Claims, 5 Drawing Sheets

SECTION A-A

| item | description |
|---|---|
| 110 | BODY |
| 112 | INWARD TAPER |
| 115 | COVER |
| 117 | SURFACE SEAL TRAP |
| 120 | RETAINER SHAFT |
| 123 | RECEPTACLE |
| 124 | SHOULDER |
| 130 | CYLINDER SHAFT |
| 140 | COUPLER |
| 150 | SEAL |
| 151 | SEAL |
| 160 | CYLINDER TUBE |
| 161 | REAR CAP |
| 162 | HEAD CAP |
| 163 | SCREWS |
| 164 | RETAINING RING |
| 165 | PISTON |
| 166 | SLEEVE BEARING |
| 170 | MAGNET |
| 171 | CYLINDER BUMPER SEAL |
| 172 | O-RING |
| 173 | U-CUP WIPER |
| 174 | PISTON SEAL |
| 175 | SET SCREW |

*Figure 4*

FLOATING SHOT PIN ASSEMBLY AND METHOD

This Application claims the benefit of U.S. Provisional Application Ser. No. 63/065,007 filed on Aug. 13, 2020 and U.S. Provisional Application Ser. No. 63/065,489 filed on Aug. 13, 2020.

SUMMARY

It is a long felt need in the assembly business to be able to combine the actions of a floating pin with a retracting pin. We have finally accomplished this. The floating action begins as soon as it starts to retract and it relieves the pressure from an assembly processes like welding or riveting. Once the side pressure on the locating pins is relieved it's exceptionally easy to retract the pin. The holes do not get damaged in aluminum or thin steel parts. This effect often referred to as "dog ear" is a major assembly problem. The pins do not get worn out in high martensite steel parts where the part is as hard as the pin. Most importantly the floating shot pin is 5 times more repeatable than any current shot pin under the most demanding applications and 50 times more repeatable in normal conditions than the accepted industry standard deflection of +/−0.005" over a 1.5 million cycle test. Current designs just barely pass at 1.5 million cycles, including our own E&E standard shot pin.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 4 is a description of components shown in FIG. 3

DETAILED DESCRIPTION

Figure 1:
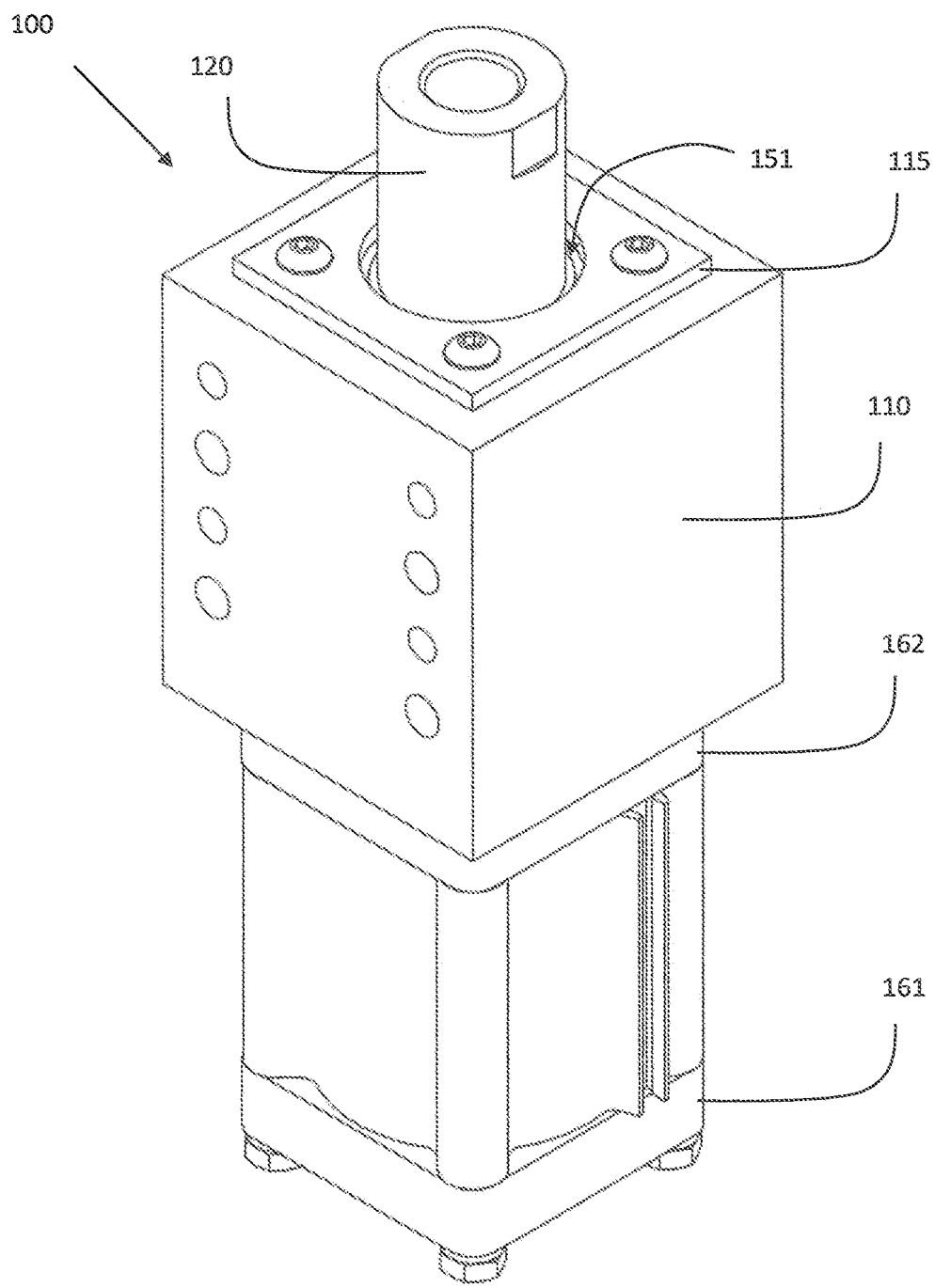
FIG. 1 is a perspective view of an exemplary floating shot pin assembly.
Figure 2:
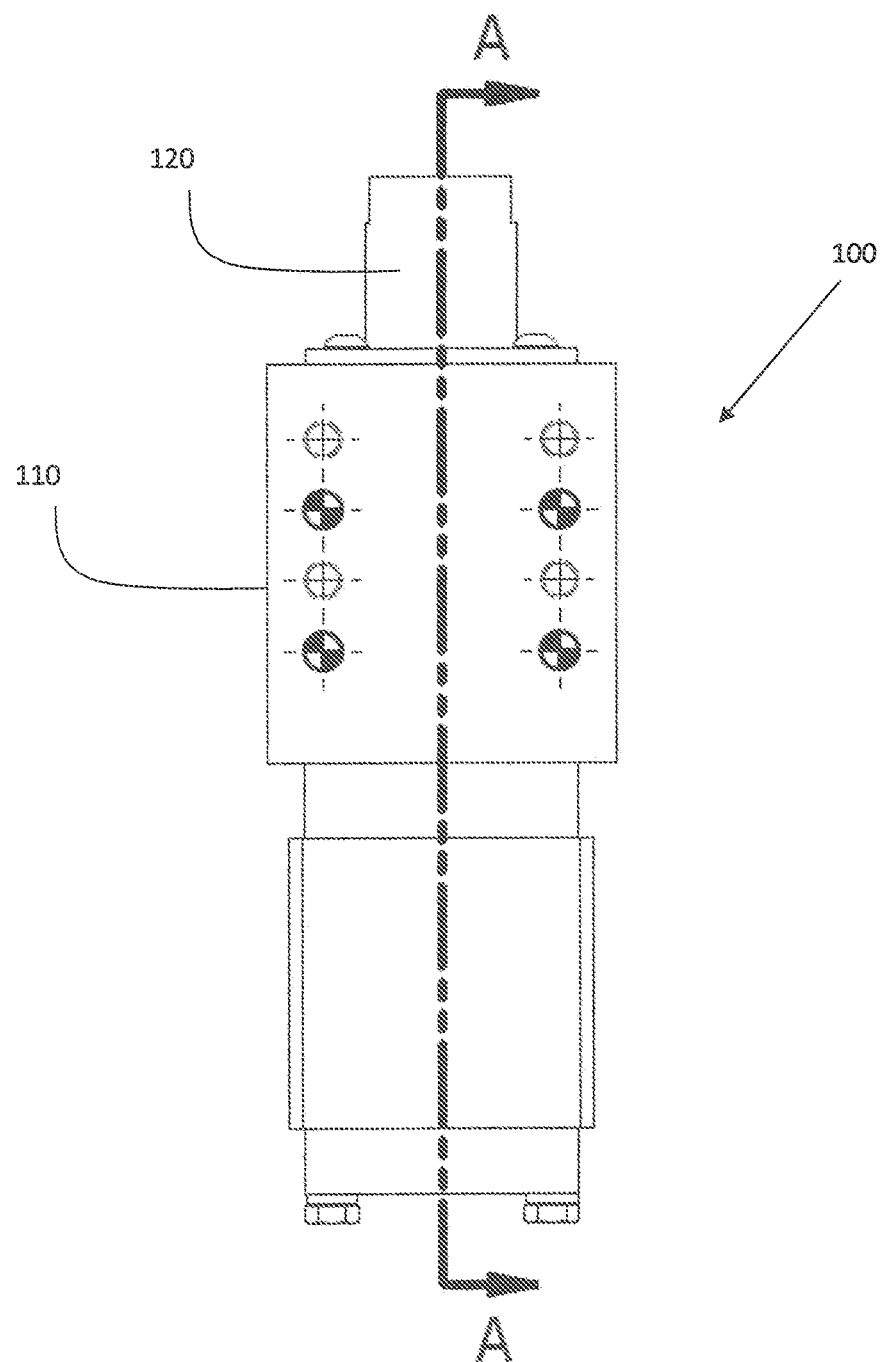
FIG. 2 is a side plan view of the exemplary floating shot pin assembly of FIG. 1.

With reference to FIGS. 1 and 2, an exemplary floating shot pin assembly 100 is shown. The floating shot pin assembly 100 is shown in the locked extended position, as further discussed below. This is the position where workpieces or parts to be assembled would be loaded. A body 110 remains stationary. A pin retainer shaft 120 is shown locked in the body 110 by applying pressure to an internal conical locking interface between portions of the body 110 and the pin retainer shaft 120 as further discussed below.

Figure 3:
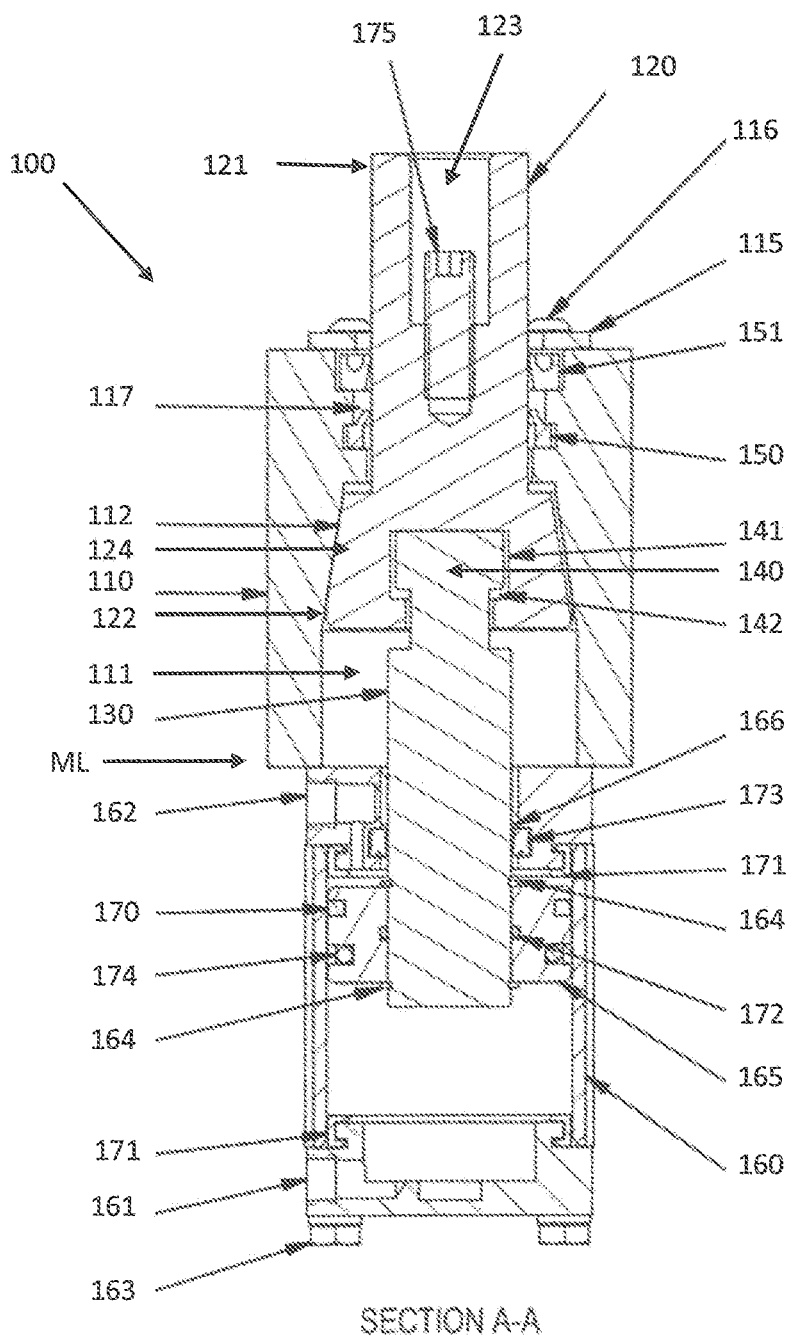
FIG. 3 is a cross-sectional view taken on line A-A of FIG. 2. Minus the customer mounting holes for clarity

Seen best in FIG. 3, the body 110 includes a shaped internal void 111 defined in the illustrated example with an inward facing taper 112 although other shapes may be employed. The pin retainer shaft 120 includes opposed upper side 121 and lower side 122. Upper side 121 includes a shaped receptacle 123 to hold a pin (not shown) and lower side 122 includes shaped shoulders 124 corresponding to the inward facing taper 112. The pin retainer shaft 120 is connected on the lower side 122 to a cylinder shaft 130. The pin retainer shaft 120 and cylinder shaft 130 are loosely joined by a "button in key slot" rap coupler 140 that floats in both the linear and radial directions using floatable dead spaces 141 and 142 when the assembly is in the floating or unlocked state. Space 141 allows radial movement and we have found a space of about 1 mm is suitable for this purpose. Space 142 allows linear movement and we have found a space of about 2 mm is suitable for this purpose.

When in an unlocked position and pressure is applied by a cylinder shaft 130, the pin retainer shaft 120 is urged upward until the inward facing taper 112 and the shaped shoulders 124 contact and what we call a "tapered lock" function is obtained. That is, the pin retainer shaft 120 is at its maximum extension in the assembly 100 and locked in place.

When work is complete, the assembly is returned to its floating or unlocked state and the 2 mm space 142 linearly between the pin retainer shaft 120 and the cylinder shaft 130 assures the tapered lock releases utilizing the kinetic energy created when the cylinder rod 130 accelerates under no load in the retract direction. Two seals 150 and 151 float radially along with the pin retainer shaft 120 and inside of the body 110 to relieve seal pressure and minimize seal wear during the retract process. We have found that the seals 150 and 151 contribute importantly to the design. A seal retainer cover 115 surrounds the pin retainer shaft 120 and retains seal 151. Screws 116 provide easy maintenance access for the sacrificial primary seal 151.

The most common metal assembly methods are welding and laser cutting/welding. Both produce fine hot particulate that completely covers the shot pins during production. Both the seals 150 and 151 utilize a floating labyrinth outer diameter (O.D.) to seal with the body 110 and an elastomerically pressurized inner lip to seal with the pin retainer shaft 120. The upper seal 150 is sacrificial and easily replaceable. The lower seal 150 can be replaced but is considered permanent for the life of the floating shot pin assembly 100. There is a designed space 117 between seals 150 and 151 to trap any particulate that gets past the upper seal 151. This new multi stage seal assembly both seals linearly on pin retainer 120 and floats radially with it during retraction.

The components down from a mating line, ML, are standard cylinder components. These include a cylinder tube 160 bounded by opposed caps 161 and 162 all held in place with to the body 110 for example with screws 163. A pair of opposed retaining rings 164 hold a cylinder shaft 130 to a piston 165. Operation of the piston 165 moves the cylinder shaft 130 through a sleeve bearing 166, The cylinder shaft 130 advances through spaces within the coupler 140 and contacts the pin retainer shaft 120 enabling the simultaneous retraction and floating functions.

Floating shot pin assemblies 100 can be made using air, hydraulic and electric actuation depending on the source of motive power used to operate the male side of the coupler shown as cylinder shaft 130 in this example. Also, floating shot pin assemblies 100 can be freely rotatable as shown above where the body 110 and the pin retainer shaft 120 lock together in a highly repeatable manner but the pin retainer shaft 120 is free to rotate relative to the body 110 and cylinder shaft 130 during retraction. The illustrated unit is for use with round Naams pins and shimming is done at the body 110 using standard Naams L-blocks and shims.

Also contemplated is an anti rotate version where the taper lock feature becomes a male/female square pyramid or another anti-rotate shape or feature between body, 1, and pin retainer shaft, 2. This will allow Naams L-blocks, pin retainers and finger shims to be used on four sides of the mounting end of the pin retainer shaft, 2. This would allow the unit to shim at the pin in addition to the shim at the body unit shown.

Figure 5:
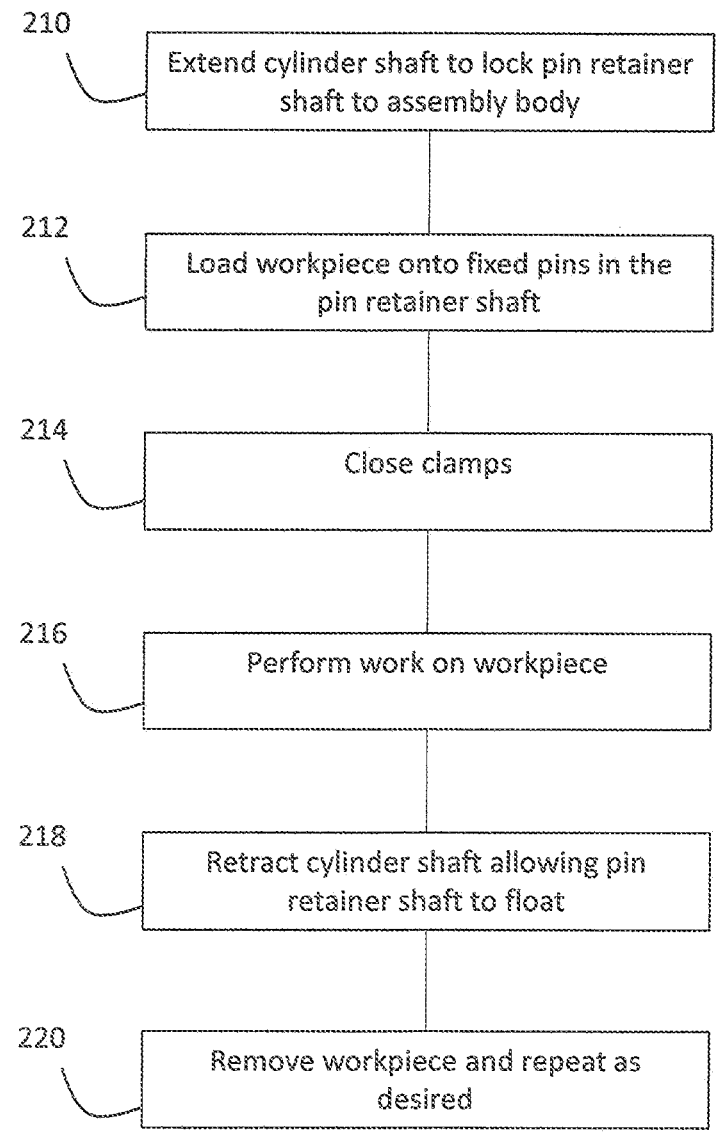
FIG. 5 is an exemplary method of using the floating shot pin assembly.

As illustrated by FIG. 5, one common sequence o operation would be as follows:

1 The cylinder is extended verified by the extend switch. 210. This locks the pin.
2 The loose parts are loaded onto the fixed pins that provide repeatable geometry to the assembly. 212. The clamps are closed. 214.
3 The welding, laser welding, riveting or other assembly process is completed. 216. These processes induce heat, clamping pressure, and hole to hole assembly stress that puts side load on the pins that are mounted to the receptacle of the floating shot pin assembly.
4. The floating shot pin is retracted 218 which allows the stress to be relieved before and during retract. This ideal action increases pin life and does not deform the tightly toleranced locating holes while the assembly is being removed from the fixture.
5. Repeat from 1. 220.

As may now be appreciated, the benefits from such an assembly are numerous.

First and foremost the floating shot pin assembly ushers in a new era of precision in sheet metal assembly repeatability by a factor of 5 to 50 times Second the floating shot pin assembly is 12 the length and weight of a standard shot pin which it replaces and was tested against. This is a huge advantage in today's crowded multi model tools.

Eliminating the side pressure greatly reduces the noise associated with pins retracting through metal.

Because there is no pressure smaller cylinders can be used reducing air consumption.

Pin wear is a very costly problem in welding plants both for replacement parts and out of tolerance scrap due to worn pins. The floating shot pin assembly eliminates this problem.

Hole damage is another huge plant problem. Most multi stage assemblies have several geometry holding or "geo" holes and pass through four or more assembly stations where these holes are used every time. If these holes are damaged by current retracting pins using brute force of large cylinders, proper nesting of the part in subsequent stations leads to compounded errors and scrap. The floating shot pin assembly completely eliminates this problem by floating during the retract process and gently, quietly removing the pins.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples. shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both." When the applicants intend to indicate "only A or B but not both" then the term "only A or B but not both" will be employed. Similarly, when the applicants intend to indicate "one and only one" of A, B or C, the applicants will employ the phrase "one and only one." Thus, use of the term "or" herein is the inclusive, and not the exclusive use. See, Bryan A. Garner, A Dictionary of Modern Legal Usage 624 (2d. Ed. 1995). To the extent that the phrase "one or more of A, B and C" is employed herein, (e.g., a data store configured to store one or more of A, Band C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C," then the phrasing "at least one of A, at least one of B, and at least one of C" will be employed.

We claim:

1. A floating shot pin assembly comprising:
   a body having a shaped internal void including an inward tapered mid-portion;
   a cylinder connected to a lower side of the body, the cylinder having a linearly movable cylinder shaft connectable to a source of motive power; and
   a pin retainer shaft at least partially housed within the internal void and connected to the cylinder shaft by a coupler, the pin retainer shaft including a shaped shoulder portion corresponding to the inward tapered mid-portion of the body;
   where in an extended state, the cylinder shaft urges the shaped shoulder portions of the pin retainer shaft to engage with the inward tapered mid-portion of the body creating a locked position to support a workpiece on a pin while work is performed; and upon completion of work, the cylinder shaft retracts pulling the pin retainer shaft to a floating state allowing the pin retainer shaft to float within clearances in the body and in the coupler thereby relieving part pressure on the pin during extract and while the workpiece is removed.

2. The floating shot pin assembly as set forth in claim 1, where the coupler permits the pin retainer shaft to rotate relative to the cylinder shaft and the body when in the retracted state.

3. The floating shot pin assembly as set forth in claim 1, where the pin retainer shaft is non-rotatably supported on the cylinder shaft and incapable of rotating relative to the cylinder shaft.

4. The floating shot pin assembly as set forth in claim 1, where the pin retainer shaft includes a pin receptacle and at least part of the pin retainer shaft extends linearly from the body through a sacrificial upper seal.

5. The floating shot pin assembly as set forth in claim 1, where the source of motive power includes pneumatic pressure.

6. The floating shot pin assembly as set forth in claim 1, where the source of motive power includes hydraulic pressure.

7. The floating shot pin assembly as set forth in claim 1, where the source of motive power includes an electric motor.

8. The floating shot pin assembly as set forth in claim 1, where in the retracted state, the coupler permits the pin retainer shaft to freely float in both linear and radial directions relative to both the body and the cylinder shaft to facilitate a floating motion of the pin retainer shaft without damaging the motive power source.

9. The floating shot pin assembly as set forth in claim 1, further comprising at least two seals, each including a floating outer diameter to seal with the body and a pressurized inner diameter to seal with the pin retainer shaft, where the seals move radially with the pin retainer shaft to retard entry of contaminants.

10. A method of operating the floating shot pin assembly as set forth in claim 1, the method comprising:
- providing the floating shot pin assembly as set forth in claim 1;
- extending the cylinder shaft to lock the pin retainer shaft in the locked position;
- loading a workpiece onto fixed pins in the pin retainer shaft;
- performing work on the workpiece;
- retracting the cylinder shaft allowing the pin retainer shaft to float; and
- remove the workpiece.

\* \* \* \* \*